United States Patent
Kato et al.

(10) Patent No.: US 9,062,714 B2
(45) Date of Patent: Jun. 23, 2015

(54) BEARING DEVICE

(71) Applicant: DAIDO METAL COMPANY LTD., Nagoya (JP)

(72) Inventors: Kenta Kato, Inuyama (JP); Takeharu Yamamoto, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 14/300,317

(22) Filed: Jun. 10, 2014

(65) Prior Publication Data

US 2014/0369632 A1 Dec. 18, 2014

(30) Foreign Application Priority Data

Jun. 14, 2013 (JP) .................. 2013-125171

(51) Int. Cl.
*F16C 9/02* (2006.01)
*F16C 33/10* (2006.01)

(52) U.S. Cl.
CPC ......... *F16C 33/1085* (2013.01); *F16C 33/1055* (2013.01); *F16C 33/1065* (2013.01); *F16C 2240/40* (2013.01); *F16C 2240/42* (2013.01); *F16C 2240/94* (2013.01); *F16C 2240/30* (2013.01); *F16C 9/02* (2013.01)

(58) Field of Classification Search
CPC ............ F16C 9/02; F16C 9/04; F16C 33/106; F16C 33/1065; F16C 33/1025; F16C 33/103; F16C 33/1055; F16C 33/1085; F16C 33/1075
USPC .......................................... 384/288
See application file for complete search history.

(56) References Cited

U.S. PATENT DOCUMENTS

| 2,163,586 | A | 6/1939 | Coleman | |
| 8,151,758 | B2* | 4/2012 | Ni et al. | 123/196 R |
| 8,783,954 | B2* | 7/2014 | Garnier | 384/286 |
| 2010/0046869 | A1* | 2/2010 | Matsuyama | 384/288 |
| 2012/0294558 | A1* | 11/2012 | Ovares et al. | 384/288 |

FOREIGN PATENT DOCUMENTS

| EP | 2541080 | 1/2013 |
| WO | WO 2012/123213 | 9/2012 |

OTHER PUBLICATIONS

European Search Report issued Oct. 20, 2014 in corresponding European patent application Serial No. 14172356.9-1751 (six pages).

* cited by examiner

*Primary Examiner* — Alan B Waits
(74) *Attorney, Agent, or Firm* — Harness, Dickey & Pierce, P.L.C.

(57) ABSTRACT

A bearing device includes: a journal part, a main bearing, a cylinder block, and a bearing cap. One half bearing held by the cylinder block includes: a first circumferential oil groove and a second circumferential oil groove being formed at positions opposite to an inlet of an oil passage of the journal part; a separation part separating the first circumferential oil groove and the second circumferential oil groove; and an oil hole penetrating from the first circumferential oil groove to an outer circumferential surface. A length L1 in a circumferential direction of the separation part at a position in the inner circumferential surface of the one half bearing is smaller than a length L2 in the circumferential direction of the inlet of the journal part.

6 Claims, 10 Drawing Sheets

BEARING DEVICE

INCORPORATION BY REFERENCE

The present application claims priority from JP Patent Application Ser. No. 2013-125171 filed on Jun. 14, 2013, the content of which is hereby incorporated by reference into this application.

BACKGROUND OF THE INVENTION (1) Field of the Invention

The present invention relates to a bearing device of a crankshaft, and more particularly to a bearing device which includes a journal part of a crankshaft, a main bearing which rotatably supports the journal part, and a cylinder block and a bearing cap which hold the main bearing.

(2) Description of Related Art

A crankshaft of an internal combustion engine is supported at its journal part, through a main bearing constituted of a pair of half bearings, under a cylinder block of the internal combustion engine. To lubricate this main bearing, lubricating oil discharged by an oil pump is fed through an oil gallery formed inside a wall of the cylinder block and a through-hole formed in a wall of the main bearing, into a lubricating oil groove which is formed along an inner circumferential surface of the main bearing.

The crankshaft is formed with a first lubricating oil passage penetrating the journal part in the diametrical direction, and the first lubricating oil passage communicates through openings at its both ends with a circumferential oil groove of the main bearing. A second lubricating oil passage branching off from the first lubricating oil passage is formed so as to pass through a crankarm part, and the second lubricating oil passage communicates with a third lubricating oil passage formed to penetrate a crankpin in the diametrical direction. Thus, the lubricating oil fed into the lubricating oil groove of the main bearing passes through the first lubricating oil passage, the second lubricating oil passage, and the third lubricating oil passage, and thereafter is fed through an opening (a lubricating oil outlet formed in an outer circumferential surface of the crankpin) at an end part of the third lubricating oil passage, onto sliding surface between the crankpin and a connecting rod bearing.

In recent years, the oil pump for supplying lubricating oil has been reduced in size with the aim of lowering the fuel consumption of the internal combustion engine. In response to this trend, a main bearing has been proposed, wherein at least one of the pair of half bearings constituting the main bearing includes: an oil hole for introducing lubricating oil which penetrates a bearing wall plate; an oil distribution groove which extends in a circumferential direction in an inner circumferential surface and communicates with the oil hole; and a collection groove which extends in the circumferential direction to collect the lubricating oil on the inner circumferential surface of the half bearing without communicating with the oil distribution groove (e.g., see FIG. 2 of International Publication No. WO 2012/123213).

In this main bearing of International Publication No. WO 2012/123213, since the lubricating oil supplied from the oil gallery inside the cylinder block to the main bearing flows only into the oil distribution groove and does not flow into the collection groove, the amount of oil supplied to the main bearing can be reduced. That is, making the oil flow to the connecting rod bearing through the first lubricating oil passage, the second lubricating oil passage, and the third lubricating oil passage requires the lubricating oil inside the oil distribution groove to be at a high pressure. The flow rate of the lubricating oil to be supplied can be lowered by reducing the volume of the oil distribution groove as is shown in International Publication No. WO 2012/123213.

A negative pressure is generated in the collection groove of the main bearing of International Publication No. WO 2012/123213, since the collection groove is a closed space without the oil hole which penetrates the bearing wall plate to introduce the lubricating oil. This creates a suctioning effect due to the negative pressure, which causes the surrounding lubricating oil to be suctioned. As the suctioned lubricating oil is again supplied onto the inner circumferential surface, the amount of lubricating oil supplied to the main bearing can be reduced. International Publication No. WO 2012/123213 achieves the reduction in size of the oil pump by means of the effect described above.

BRIEF SUMMARY OF THE INVENTION

There is a problem in the bearing device of the crankshaft using the main bearing of International Publication No. WO 2012/123213: that is, during operation of the internal combustion engine, the lubricating oil is sufficiently supplied to the crankpin part (to a clearance between the crankpin surface and the inner circumferential surface of the crankpin part bearing) as long as an inlet of the first lubricating oil passage of the journal part is in communication with the oil distribution groove of the half bearing. However, the lubricating oil supply to the crankpin part becomes insufficient and the crankpin part bearing is likely to be damaged while the inlet of the first lubricating oil passage is in communication with the collection groove.

In addition, by the end of communication between the inlet of the first lubricating oil passage and the collection groove, the amount of oil inside the collection groove has become small. Thus, immediately after the termination of the communication, the amount of the lubricating oil on the inner circumferential surface becomes insufficient near the collection groove, and damage is likely to occur as the inner circumferential surface of the half bearing comes into direct contact with the journal surface.

In view of this, it is an object of the present invention to provide a bearing device which not only can reduce the amount of lubricating oil supplied to the main bearing, but also is excellent in supplying the lubricating oil to the crankpin part.

To achieve the above object, the present invention provides a bearing device for rotatably supporting a journal part of a crankshaft. The bearing device includes: a journal part having an oil passage extending inside thereof and an inlet of the oil passage being open on an outer circumferential surface of the journal part; a main bearing being constituted of a pair of half bearings and rotatably supporting the journal part; and a cylinder block and a bearing cap being each formed with a holding bore for holding the main bearing. One half bearing being held in the holding bore of the cylinder block includes: a first circumferential oil groove and a second circumferential oil groove being formed at positions opposite to the inlet of the oil passage of the journal part in an inner circumferential surface of the one half bearing; a separation part separating the first circumferential oil groove and the second circumferential oil groove; and an oil hole penetrating from the first circumferential oil groove to an outer circumferential surface of the one half bearing. A length L1 in a circumferential direction of the separation part at a position in the inner circumferential surface of the one half bearing is smaller than a length L2 in the circumferential direction of the inlet of the journal part.

Here, the crankshaft refers to a member which includes a journal part, a crankpin part, and a crankarm part. The half bearing refers to a member having a shape of a ring divided substantially into halves, which, however, are not necessarily halves in the strict sense.

Thus, the bearing device of the present invention is characterized in that one of the half bearings which is held in the holding bore of the cylinder block has the first circumferential oil groove and the second circumferential oil groove, the separation part, and the oil hole penetrating from the first circumferential oil groove to an outer circumferential surface of the one half bearing, and that a length L1 in a circumferential direction of the separation part at a position in the inner circumferential surface of the one half bearing is smaller than a length L2 in the circumferential direction of the inlet of the journal part.

According to this configuration, a part of the lubricating oil inside the first circumferential oil groove is supplied to the second circumferential oil groove through the inlet of the oil passage of the journal part when the inlet of the oil passage of the journal part is in communication with the first circumferential oil groove and the second circumferential oil groove. For this reason, it is unlikely that the amount of the lubricating oil on the inner circumferential surface becomes insufficient near the second circumferential oil groove and the inner circumferential surface of the half bearing comes into direct contact with the surface of the journal part.

Moreover, the lubricating oil is fed only to the first circumferential oil groove through the oil hole. Thus, since the amount of oil discharged by the oil pump can be set on the basis of the internal volume of one circumferential oil groove, a sufficient amount of lubricating oil can be supplied even by a small oil pump. In addition, since the lubricating oil is supplied to the oil passage of the journal part through both the circumferential oil grooves, the lubricating oil can be continuously supplied to the crankpin part.

DETAILED DESCRIPTION OF THE INVENTION

In the following, embodiments of the present invention will be described with reference to the drawings.

EMBODIMENT 1

(Overall Configuration of the Bearing Device)

Figure 1:
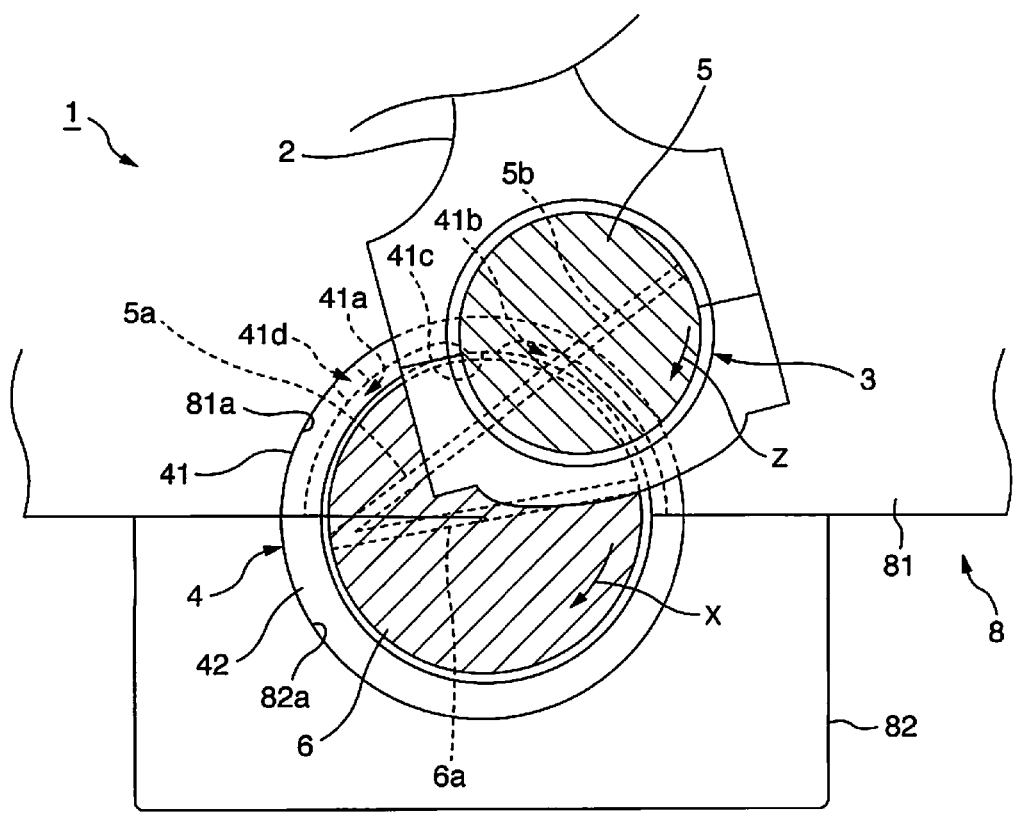
FIG. 1 is a cross-sectional view of a crankshaft of an internal combustion engine cut at a journal part and a crankpin part.

First, an overall configuration of a bearing device 1 of this embodiment will be described with reference to FIGS. 1 and 2. As shown in FIG. 1, the bearing device 1 of this embodiment includes: a journal part 6 having a first lubricating oil passage 6a as an oil passage extending inside the journal part 6 and inlets 6b, 6b of the first lubricating oil passage 6a being open on an outer circumferential surface of the journal part 6; a main bearing 4 being constituted of a pair of half bearings 41 and 42 and rotatably supporting the journal part 6; and a cylinder block 81 and a bearing cap 82 being formed with holding bores 81a and 82a respectively for holding the main bearing 4. The first lubricating oil passage 6a serving as an oil passage is provided for supplying lubricating oil to a crankpin part 5.

In addition to the above, the bearing device 1 includes: a crankpin part 5 which is formed integrally with the journal part 6 through a crankarm part (not shown) and rotates around the journal part 6; a connecting rod 2 which transmits reciprocating movement from an internal combustion engine to the crankpin part 5; and a connecting rod bearing 3 which rotatably supports the connecting rod 2.

Although the crankshaft in practice includes multiple journal parts 6 and multiple crankpin parts 5, only one journal part 6 and one crankpin part 5 are shown here for the convenience of illustration. In FIG. 1, the positional relationship in a depth direction of the drawing is that the journal part 6 is on the farther side in the drawing and the crankpin part 5 is on the nearer side.

(Configuration of the Journal Part)

The journal part 6 serves as a rotary shaft when the crankshaft rotates, and is formed of metal in a short columnar shape integral with the crankarm part (not shown) and the crankpin part 5. The journal part 6 is rotatably supported under the cylinder block 81 of the internal combustion engine through the main bearing 4 constituted of the pair of half bearings 41 and 42.

The journal part 6 includes the first lubricating oil passage 6a as an oil passage extending inside thereof, and the inlets 6b, 6b which is open on the outer circumferential surface of the journal part 6 at both ends of the first lubricating oil passage 6a. A second lubricating oil passage 5a is formed which branches off from the first lubricating oil passage 6a and passes through the crankarm part, and the second lubricating oil passage 5a communicates with a third lubricating oil passage 5b extending inside the crankpin part 5.

The first lubricating oil passage 6a of the journal part 6 extends linearly to penetrate the columnar shape of the journal part 6 at its maximum diameter part in the diametrical direction, forming the two inlets 6b, 6b in the surface of the journal part 6. As the two inlets 6b, 6b are separated from each other at an angle of 180° in the circumferential direction of the journal part 6, the inlets 6b, 6b alternately communicate with the first circumferential oil groove 41a and the second circumferential oil groove 41b.

Unlike this embodiment, if an oil passage is formed, for example, in an L-shape with the two inlets of the journal part forming a circumferential angle of 90° (270°) around the central axis of the journal part, a state periodically occurs in which the first circumferential oil groove 41a and the second circumferential oil groove 41b communicate simultaneously with the inlets. This makes it necessary to set the discharge flow rate of the oil pump on the basis of an internal volume obtained by adding up the internal volumes of the first circumferential oil groove 41a and the second circumferential oil groove 41b. Thus, the reduction in size of the oil pump cannot be achieved. Moreover, in this case, a state periodically occurs in which the first circumferential oil groove 41a and the second circumferential oil groove 41b do not communicate with either of the inlets, during which the lubricating oil is not supplied to the connecting rod bearing 3.

Figure 5A:
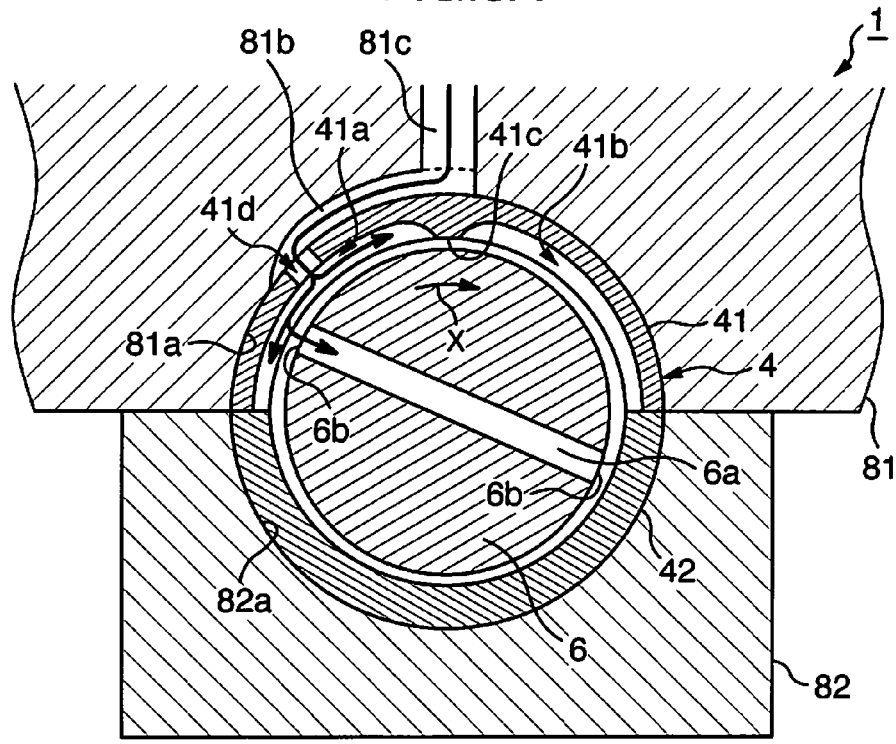
FIG. 5A is a view illustrating the operation of the bearing device of Embodiment 1 in a state where an inlet of an oil passage is in communication with a first circumferential oil groove.
Figure 5B:
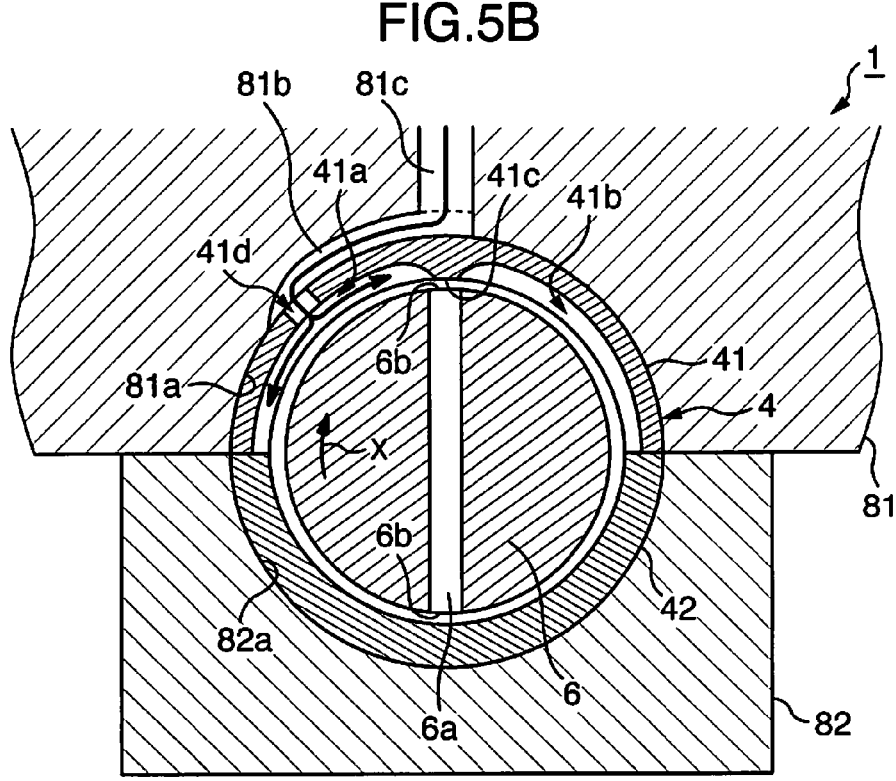
FIG. 5B is a view illustrating the operation of the bearing device of Embodiment 1 in a state where the inlet of the oil passage is in communication with a first circumferential oil groove and a second circumferential oil groove.
Figure 14:
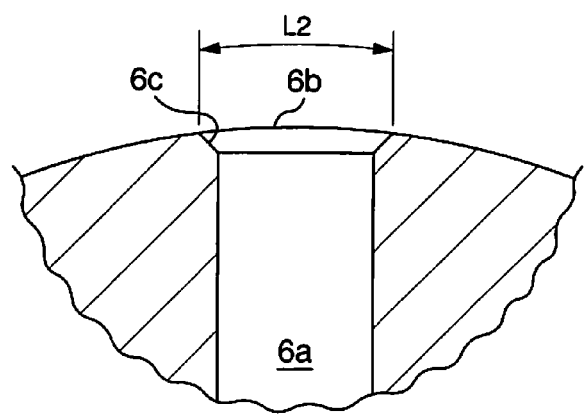
FIG. 14 is a view illustrating a length L2 of the inlet.

As shown in FIGS. 5A and 5B, the inlet 6b has a circular shape with the same area as a cross-sectional area of the first lubricating oil passage 6a viewed in the axial direction. However, the present invention is not limited to this example. The inlet 6b may have a larger area than the first lubricating oil passage 6a as shown in FIG. 14, or may have an oval shape in the outer circumferential surface of the journal part 6. When the area of the inlet 6b is larger than the cross-sectional area of the first lubricating oil passage 6a, a transition part 6c, which gradually changes (decreases) in cross-sectional area along the axial direction of the first lubricating oil passage 6a, is formed with a depth of 1 to 2 mm between the inlet 6b and the first lubricating passage 6a.

(Configuration of the Half Bearing)

Figure 2:
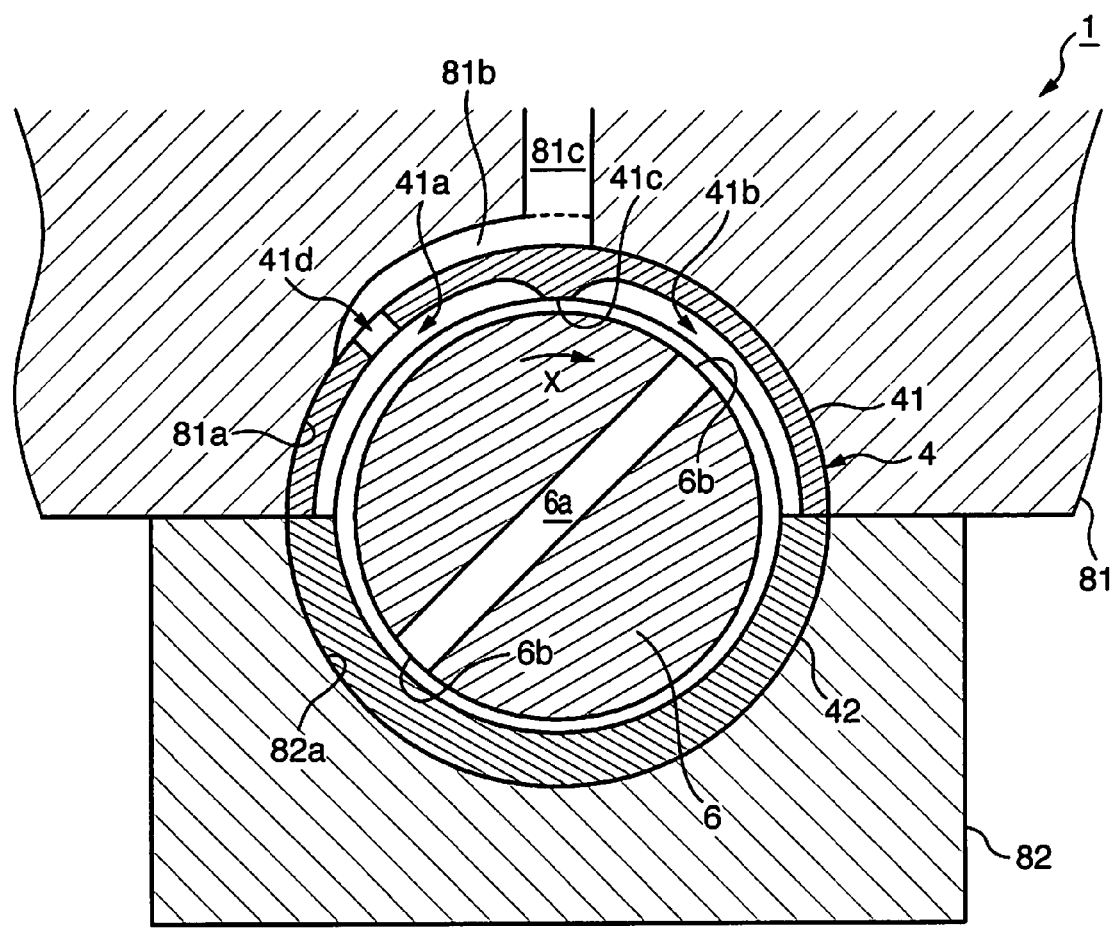
FIG. 2 is a cross-sectional view illustrating a configuration of a bearing device of Embodiment 1.
Figure 3:
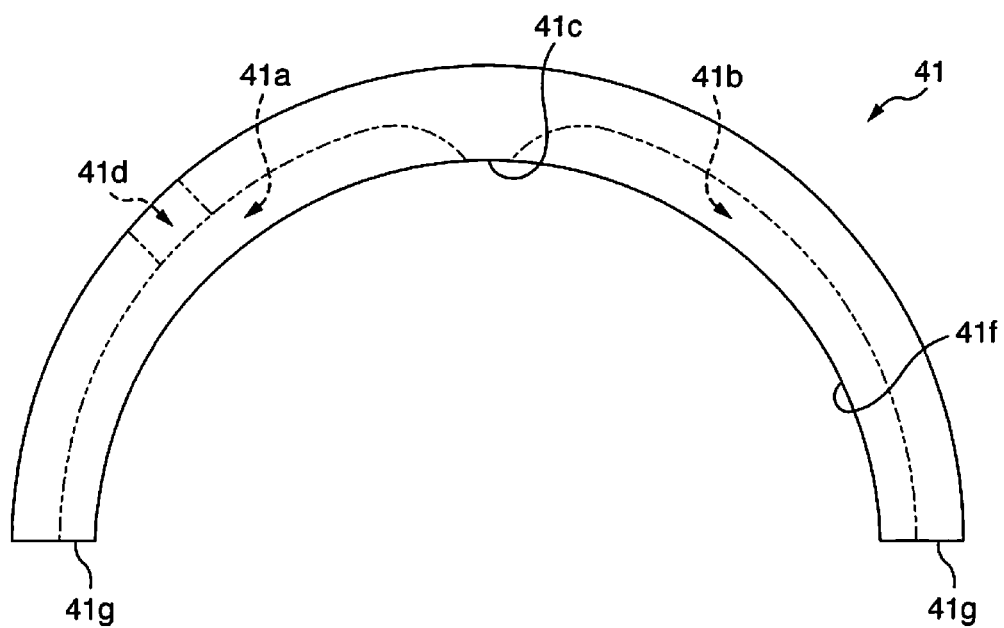
FIG. 3 is a side view illustrating a configuration of a half bearing of Embodiment 1.
Figure 4:
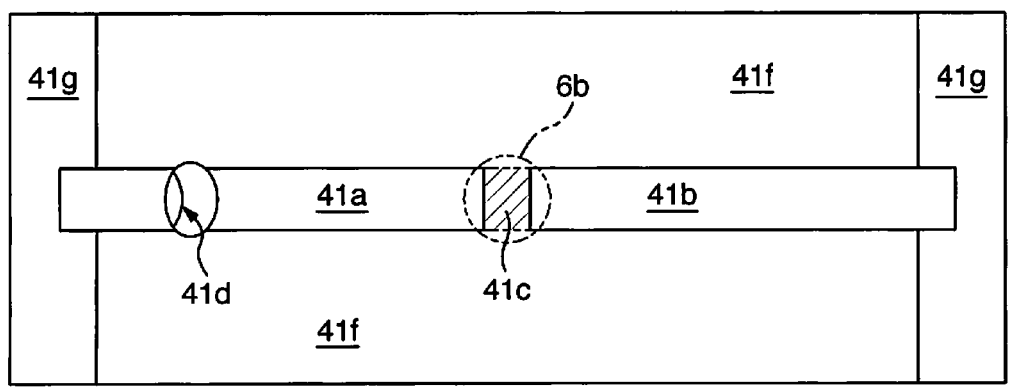
FIG. 4 is a bottom view illustrating the configuration of the half bearing of Embodiment 1.

As shown in FIGS. 2 to 4, the main bearing 4 is constituted of a combination of the two half bearings 41 and 42 butted against each other at their end surfaces into a cylindrical shape. The upper half bearing 41 is fitted into the holding bore 81a of the cylinder block 81, while the lower half bearing 42 is fitted into the holding bore 82a of the bearing cap 82, and as a whole, the half bearings 41 and 42 form a cylindrical shape. In the following, the upper half bearing 41 of the two half bearings 41 and 42 will be described, which has a shape characteristic of the present invention. It is preferable that the lower half bearing 42 has a general shape, and does not have the first circumferential oil groove, the second circumferential oil groove, and the oil hole, which will be described later. This is because when the lower half bearing 42 is provided with the circumferential oil groove, the required supply of lubricating oil increases by the amount corresponding to the internal volume of the circumferential oil groove, making it difficult to achieve the reduction in size of the oil pump.

As shown in FIG. 3, the upper half bearing 41 is formed of bimetal obtained by laminating a bearing alloy onto a steel plate into a semi-cylindrical shape. The half bearing 41 includes: a first circumferential oil groove 41a and a second circumferential oil groove 41b which are formed at positions opposite to the inlet 6b of the first lubricating oil passage 6a of the journal part 6 in the inner circumferential surface of the one half bearing 41; a separation part 41c which separates the first circumferential oil groove 41a and the second circumferential oil groove 41b; and an oil hole 41d which penetrates from the first circumferential oil groove 41a to the outer circumferential surface of the one half bearing 41. It is noted that the second circumferential oil groove 41b does not have such an oil hole. The half bearing 41 has a symmetrical shape with respect to the separation part 41c in the center except for the configuration of the oil hole 41d.

Here, it is preferable that the first circumferential oil groove 41a is positioned on the rear side in a rotational direction of the journal part 6 with respect to the second circumferential oil groove 41b (separation part 41c). Unlike the configuration of the embodiment, the first circumferential oil groove 41a may be positioned on the front side in the rotational direction of the journal part 6 with respect to the second circumferential oil groove 41b. Here, the rear side in the rotational direction of the journal part 6 refers to a side through which a certain point on the surface of the journal part 6 passes just before it faces the separation part 41c.

As can be seen from FIGS. 2 and 3, the first circumferential oil groove 41a and the second circumferential oil groove 41b formed in the inner circumferential surface of the half bearing 41 extend from circumferential end surfaces 41g, 41g of the half bearing 41 toward the center in the circumferential direction. The first circumferential oil groove 41a and the second circumferential oil groove 41b are each formed with a constant depth in a region except for near the center, and formed so as to gradually decrease in depth toward the separation part 41c near the center.

The first circumferential oil groove 41a and the second circumferential oil groove 41b do not extend up to the center in the circumferential direction of the half bearing 41, and therefore an inner circumferential surface 41f partially remains between the end part of the first circumferential oil groove 41a on the center side and the end part of the second circumferential oil groove 41b on the center side (FIGS. 2, 3, and 4). Hereinafter, the part of the inner circumferential surface partially remaining over the length L1 so as to separate (partition) the first circumferential oil groove 41a and the second circumferential oil groove 41b is referred to as the separation part 41c (the shaded portion in FIG. 4). In other words, the first circumferential oil groove 41a and the second circumferential oil groove 41b extend over the entire length in the circumferential direction except for the length of the separation part 41c in the center. The length L1 in the circumferential direction of the separation part 41c is defined as a length measured along the cylindrical surface which forms the inner circumferential surface 41f.

Figure 11:
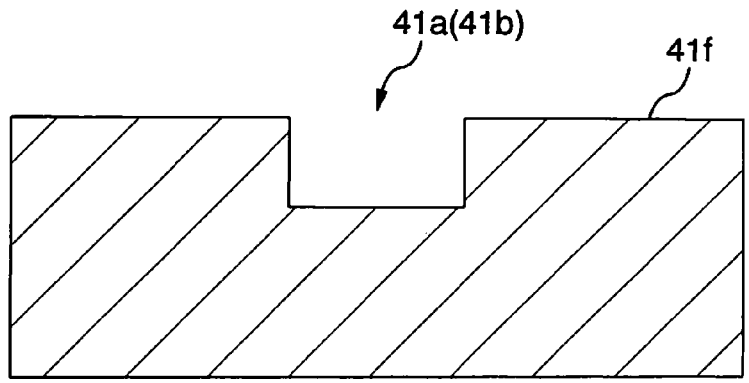
FIG. 11 is a cross-sectional view illustrating a cross-sectional shape of the circumferential groove of Embodiment 1.
Figure 12:
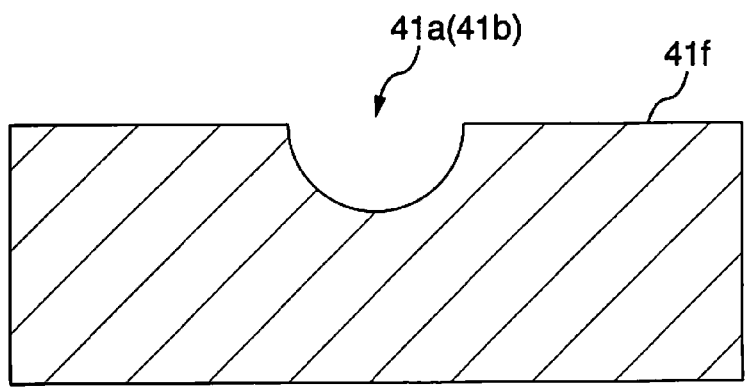
FIG. 12 is a cross-sectional view illustrating a cross-sectional shape of a circumferential groove of another form.
Figure 13:
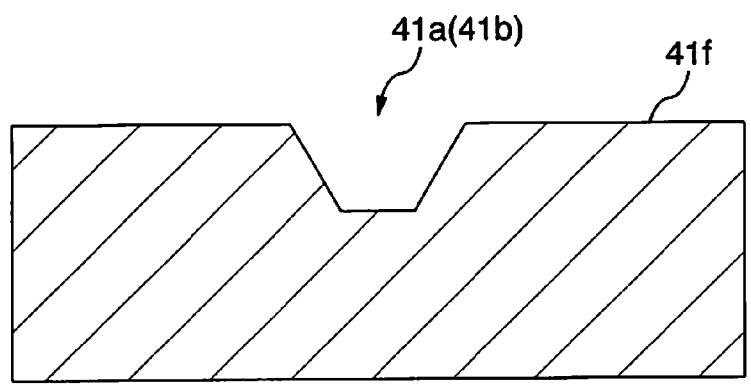
FIG. 13 is a cross-sectional view illustrating a cross-sectional shape of a circumferential groove of another form.

As shown in FIG. 11, the cross-sections of the first circumferential oil groove 41a and the second circumferential oil groove 41b are formed in a rectangular shape. However, the cross-section may have a semi-circular shape or a round shape as shown in FIG. 12, or an inverted trapezoidal shape (a trapezoidal shape wider at the inner circumferential side) as shown in FIG. 13.

As can be seen from FIG. 4, the first circumferential oil groove 41a and the second circumferential oil groove 41b are positioned at the middle of the width in the axial direction of the half bearing 41. The bottom part (deepest part) of the first circumferential oil groove 41a is formed with the first oil hole 41d which penetrates the wall plate of the half bearing 41 in the radial direction. Thus, the lubricating oil flows from the oil gallery 81c inside the wall of the cylinder block 81 to the oil supplementing passage 81b of the holding bore 81a in the cylinder block 81, and thereafter is supplied through the first oil hole 41d only to the first circumferential oil groove 41a. However, instead of forming the oil supplementing passage 81b in the holding bore 81a of the cylinder block 81, the oil gallery 81c may be connected to the position of the oil hole 41d so that the lubricating oil is directly supplied from the oil gallery 81c to the first circumferential oil groove 41a through the oil hole 41d.

Figure 6:
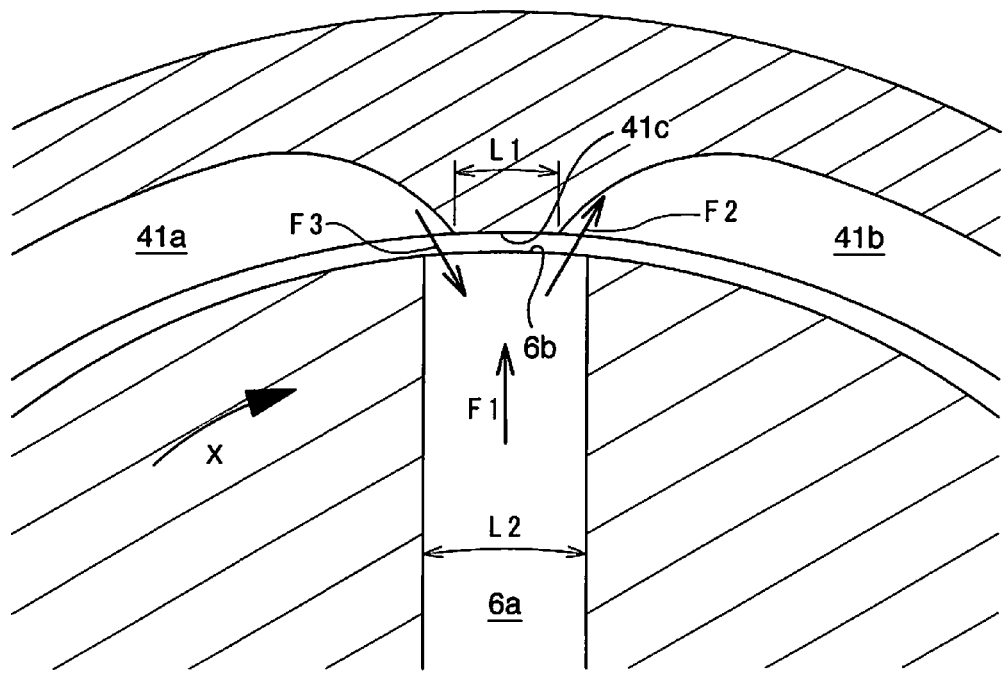
FIG. 6 is an enlarged view illustrating the operation of the bearing device of Embodiment 1.

The first circumferential oil groove 41a and the second circumferential oil groove 41b are formed so that their positions at the middle in the width direction match the center position of the inlet 6b of the first lubricating oil passage 6a of the journal part 6 (in FIG. 4, the inlet 6b at a rotation position shown in FIG. 6 is indicated by a broken line and overlapped with the separation part 41c). This allows the lubricating oil supplied to the first circumferential oil groove 41a and the second circumferential oil groove 41b to flow easily through the inlet 6b (see FIG. 2) to the connecting rod bearing 3.

It is preferable that the first circumferential oil groove 41a and the second circumferential oil groove 41b are formed so that they cover a position at least at an circumferential angle of 45° (135°) from the circumferential end surface 41g of the half bearing 41, and extend toward the center when viewed in the circumferential direction. The reason is as follows.

In principle, a centrifugal force acts on the lubricating oil inside the first lubricating oil passage 6a of the rotating journal part 6, which creates resistance when the lubricating oil inside the first circumferential oil groove 41a and the second circumferential oil groove 41b flows from the inlet 6b into the inside of the first lubricating oil passage 6a. In a region nearer to the center in the circumferential direction from the position of a circumferential angle of 45° (135°) from the circumferential end surface 41g of the half bearing 41, however, the direction of gravity acting on the lubricating oil becomes opposite to the direction in which the centrifugal force acts (the direction of the gravity becomes more directly opposite to the direction of the centrifugal force at a position closer to the center), so that the gravity counteracts the centrifugal force. This allows the lubricating oil inside the first circumferential oil groove 41a and the second circumferential oil groove 41b to flow more easily in the above-mentioned region into the inlet 6b of the first lubricating oil passage 6a of the journal part 6.

It is preferable that the oil hole 41d is formed at a position other than near the end part of the first circumferential oil groove 41a on the center side in the circumferential direction of the half bearing 41. The reason is as follows.

For example, if the oil hole is formed at the end part of the circumferential oil groove, which is on the rear side in a rotational direction X of the journal part 6 of the half bearing 41 (in FIG. 6, the circumferential oil groove 41a on the left side), on the center side in the circumferential direction of the half bearing 41, where the groove depth is formed to be small, a large part of the lubricating oil flowing from the oil hole directly flows into the first lubricating oil passage 6a of the journal part 6 when the inlet 6b of the first lubricating oil passage 6a of the journal part 6 passes this oil hole position. Thus, the moment the inlet 6b of the first lubricating oil passage 6a of the journal part 6 to be described later comes face to face with the separation part 41c and communicates with the first circumferential oil groove 41a and the second circumferential oil groove 41b, the amount of lubricating oil flowing from the first circumferential oil groove 41a to the second circumferential oil groove 41b decreases.

In this embodiment, the length L1 in the circumferential direction of the separation part 41c at the position in the inner circumferential surface 41f of the half bearing 41 is smaller than the length L2 in the circumferential direction of the inlet 6b of the journal part 6. Also, it is preferable that the following relational expression is satisfied. That is, it is preferable that the expression $L1 \geq L2 \times 0.5$ is satisfied. In addition, it is preferable that the expression $L2-L1 > 0.5$ (mm) is satisfied.

While the dimension of the inlet 6b of the lubricating oil passage 6a inside the journal part 6 differs according to the specifications of the internal combustion engine, the diameter is, for example, approximately 5 to 8 mm in the case of a small internal combustion engine of passenger cars. Similarly, in the case of a small internal combustion engine, the groove width of the first circumferential oil groove 41a and the second circumferential oil groove 41b is approximately 3 to 6 mm, and the groove depth (except for the region at the circumferential end part where the groove depth is small) is approximately 0.5 to 1.5 mm. Moreover, it is preferable that the length L1 in the circumferential direction of the separation part 41c is 1 mm or longer.

(Configuration of the Cylinder Block)

The cylinder block 81 includes: the holding bore 81a which holds the upper half bearing 41; the oil supplementing passage 81b which is formed in the holding surface constituting the holding bore 81a so as to communicate with the oil hole 41d of the upper half bearing 41; and the oil gallery 81c which supplies the lubricating oil discharged from the oil pump to the oil supplementing passage 81b.

As will be described later, the oil supplementing passage 81b is disposed near the outside of the oil hole 41d and has a predetermined internal volume so as to be able to instantaneously supplement the lubricating oil inside the first circumferential oil groove 41a and the second circumferential oil groove 41b. It is preferable that the oil supplementing passage 81b is formed on the cylinder block 81 side instead of on the half bearing 41 side. This is because forming the oil supplementing passage 81b in the holding surface of the holding bore 81a of the cylinder block 81 allows the internal volume of the oil supplementing passage 81b to be set to a larger volume. In contrast, when the groove serving as the oil supplementing passage is formed in the back surface (outer circumferential surface) of the half bearing so as to communicate with the oil hole, it is difficult to secure a sufficient volume as the oil supplementing passage due to the limited wall thickness of the half bearing.

It is preferable that the total internal volume obtained by adding up the internal volume of the first circumferential oil groove 41a and the internal volume of the second circumferential oil groove 41b of the half bearing 41 is smaller than the internal volume of the oil supplementing passage 81b of the cylinder block 81. The reason is as follows.

The first circumferential oil groove 41a and the second circumferential oil groove 41b can communicate with each other through the inlet 6b of the first lubricating oil passage 6a of the journal part 6, since the length L1 in the circumferential direction of the separation part 41c is smaller than the length L2 in the circumferential direction of the inlet 6b of the journal part 6. Therefore, as shown in FIG. 6, at the moment the inlet 6b terminates the communication with one of the grooves, i.e. the first circumferential oil groove 41a, and starts communication with the other groove, i.e. the second circumferential oil groove 41b, the lubricating oil inside the oil supplementing passage 81b flows to both the circumferential oil grooves 41a and 41b. As a result, the amount of the lubricating oil inside the circumferential oil grooves 41a and 41b can become insufficient.

If "the internal volume of the first circumferential oil groove 41a+the internal volume of the second circumferential oil groove 41b<the internal volume of the oil supplementing passage 81b", the amount of lubricating oil which is instantaneously required can be secured inside the oil supplementing passage 81b, so that the situation where the amount of the lubricating oil supplied to the circumferential oil grooves 41a and 41b becomes instantaneously insufficient can be prevented.

(Operation)

Next, the operation of the bearing device 1 of this embodiment will be described.

During operation of the internal combustion engine, the lubricating oil discharged from the oil pump flows through the oil gallery 81c of the cylinder block 81, the oil supplementing passage 81b of the cylinder block 81, the oil hole 41d, the first circumferential oil groove 41a, an internal space of the first lubricating oil passage 6a near the inlet 6b, and the second circumferential oil groove 41b, in this order.

One part of the lubricating oil inside the first and second circumferential oil grooves 41a and 41b flows onto the inner circumferential surface of the half bearing 41 (to the clearance between the inner circumferential surface of the half bearing 41 and the outer circumferential surface of the journal part 6), and another part of the lubricating oil flows into the first lubricating oil passage 6a from the inlet 6b of the journal part 6. The lubricating oil having flowed into the first lubricating oil passage 6a is further fed to the crankpin part 5 through the second lubricating oil passage 5a and the third lubricating oil passage 5b.

As shown in FIG. 5A, while the inlet 6b of the first lubricating oil passage 6a of the journal part 6 of the crankshaft is in communication with the first circumferential oil groove 41a of the half bearing 41, the lubricating oil inside the oil supplementing passage 81b of the cylinder block 81 flows through the first oil hole 41d of the half bearing 41 only to the first circumferential oil groove 41a.

As shown in FIG. 5B, while the inlet 6b of the first lubricating oil passage 6a of the journal part 6 of the crankshaft is face to face with the separation part 41c and communicates with both the first circumferential oil groove 41a and the second circumferential oil groove 41b of the half bearing 41, the lubricating oil inside the first circumferential oil groove 41a flows to the second circumferential oil groove 41b through the inlet 6b (an internal space of the first lubricating oil passage 6a near the inlet 6b) of the first lubricating oil passage 6a of the journal part 6 of the crankshaft.

Thus, in the bearing device 1 of this embodiment, the lubricating oil is fed only to the first circumferential oil groove 41a out of the first circumferential oil groove 41a and the second circumferential oil groove 41b. That is, the discharge flow rate of the oil pump can be set on the basis of the internal volume of only the first circumferential oil groove 41a. Therefore, the required oil amount can be supplied even by a small oil pump.

The inlet 6b of the first lubricating oil passage 6a of the journal part 6 is always in communication with at least one of the first circumferential oil groove 41a and the second circumferential oil groove 41b. Thus, the lubricating oil can be continuously supplied to the crankpin part 5.

As described above and shown in FIG. 5B, while the inlet 6b of the first lubricating oil passage 6a of the journal part 6 of the crankshaft is in communication with both the first circumferential oil groove 41a and the second circumferential oil groove 41b, the lubricating oil inside the first circumferential oil groove 41a flows to the second circumferential oil groove 41b through the inlet 6b (the internal space of the first lubricating oil passage 6a near the inlet 6b) of the first lubricating oil passage 6a of the journal part 6 of the crankshaft. For this reason, it is unlikely that the amount of the lubricating oil on the inner circumferential surface 41f surrounding the second circumferential oil groove 41b becomes insufficient and thereby the inner circumferential surface 41f of the half bearing 41 comes into direct contact with the surface of the journal part 6 and causes damage to the surface.

Figure 16:
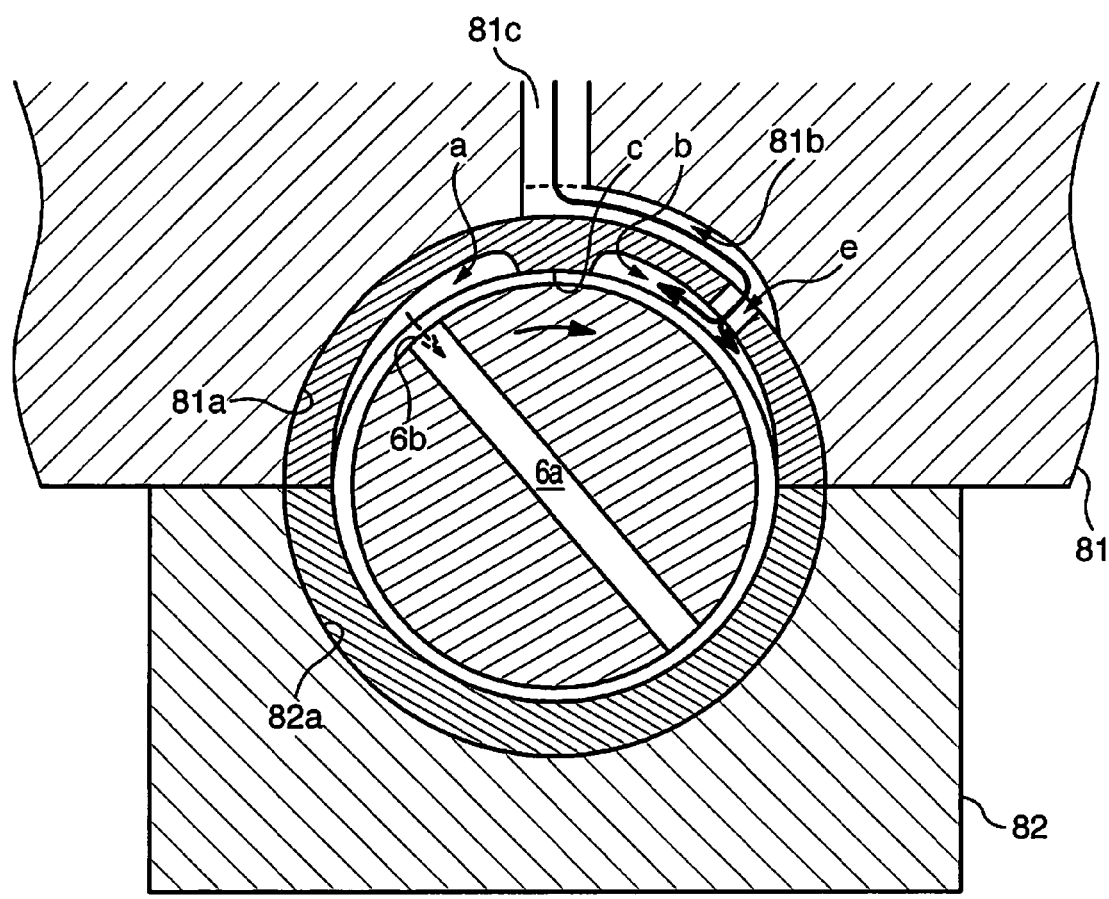
FIG. 16 is a cross-sectional view illustrating a configuration of a conventional bearing device.

In contrast, as shown in the conventional technology in FIG. 16, if no oil hole is provided in one circumferential oil groove a (in FIG. 16, the circumferential oil groove on the left) out of the first circumferential oil groove a and the second circumferential oil groove b of a half bearing, and the length in the circumferential direction of the separation part at a position in an inner circumferential surface of the half bearing is longer than the length in the circumferential direction of the inlet of the journal part so that the lubricating oil does not flow from the oil supplementing passage 81b of the cylinder block 81 to the one circumferential oil groove a, supply of the lubricating oil to the crankpin part becomes insufficient and the crankpin part bearing is likely to be damaged while the inlet 6b of the first lubricating oil passage 6a of the journal part 6 is in communication with the one circumferential oil groove a.

In addition, since the amount of lubricating oil inside the one circumferential oil groove a is always small, the lubricating oil at a relatively high pressure between the inner circumferential surface around the circumferential oil groove a and the journal surface is suctioned into the circumferential oil groove a where the pressure is relatively low. Therefore, due to insufficient amount of the lubricating oil, the inner circumferential surface surrounding the circumferential oil groove a comes into direct contact with the surface of the journal part, and the surface of the journal part is likely to be damaged.

(Instantaneous Operation)

As described above, according to the conventional technology shown in FIG. 16, as soon as the inlet of the first lubricating oil passage of the journal part terminates the communication with the first circumferential oil groove, the amount of the lubricating oil inside the first circumferential oil groove near the circumferential end part can be instantaneously insufficient.

In contrast, in the configuration where the first circumferential oil groove 41a and the second circumferential oil groove 41b communicate with each other through the inlet 6b of the first lubricating oil passage 6a as shown in FIG. 6, the lubricating oil inside the first lubricating oil passage 6a flows to the second circumferential oil groove 41b, so that the amount of the lubricating oil does not become insufficient.

More specifically, the lubricating oil inside the oil supplementing passage 81b of the cylinder block 81 flows into the first circumferential oil groove 41a. When the first circumferential oil groove 41a and the second circumferential oil groove 41b, and the inlet 6b of the first lubricating oil passage 6a start communication with each other, the lubricating oil near the inlet 6b is subjected simultaneously to the following operations: (1) a centrifugal force F1 due to rotation of the journal part 6, (2) a flow F2 due to the pressure gradient of the lubricating oil between the inside of the second circumferential oil groove 41b and the inside of the first lubricating oil passage 6a, and (3) a flow F3 due to the pressure gradient of the lubricating oil between the inside of the first lubricating oil passage 6a and the inside of the first circumferential oil groove 41a. Thus, in the lubricating oil having entered the first lubricating oil passage 6a, a flow is instantaneously formed which moves into the second circumferential oil groove 41b. However, since the communication between the first circumferential oil groove 41a and the second circumferential oil groove 41b is an instantaneous phenomenon, it causes substantially no increase in the internal volume of the oil groove. That is, it is not necessary to set the amount of discharge oil of the oil pump to a larger amount on the basis of the total internal volume of the first and second circumferential oil grooves 41a and 41b.

Unlike the configuration of the embodiment shown in FIG. 6, the first circumferential oil groove 41a may be positioned on the front side in the rotational direction of the journal part 6 with respect to the second circumferential oil groove 41b. Nevertheless, it is preferable that, similarly to the configuration of the embodiment shown in FIG. 6, the first circumferential oil groove 41a having the oil hole 41d is positioned on the rear side in the rotational direction of the journal part 6, with respect to the second circumferential oil groove 41b, in the inner circumferential surface 41f of the one half bearing 41. The reason is as follows.

The lubricating oil inside the first circumferential oil groove 41a flows in the rotational direction (X) of the journal part 6 by being entrained on the surface of the rotating journal part 6. When a flow of the lubricating oil toward the second circumferential oil groove 41b is thus formed inside the first circumferential oil groove 41a, (2) the flow F2 due to the pressure gradient between the inside of the second circumferential oil groove 41b and the inside of the first lubricating oil passage 6a, and (3) the flow F3 due to the pressure gradient between the inside of the first lubricating oil passage 6a and the inside of the first circumferential oil passage 41a shown in FIG. 6 are enhanced, so that the amount of oil supplied to the second circumferential oil groove 41b increases.

(Advantages)

Next, the advantages provided by the bearing device 1 of the present invention will be enumerated and described below.

(1) The bearing device 1 of this embodiment is characterized in that one half bearing 41 held in the holding bore 81a of the cylinder block 81 has the first circumferential oil groove 41a and the second circumferential oil groove 41b, the separation part 41c, and the oil hole 41d, and wherein a length L1 in a circumferential direction of the separation part 41c at a position in the inner circumferential surface of the one half bearing 41 is smaller than a length L2 in the circumferential direction of the inlet 6b of the journal part 6.

According to this configuration, the lubricating oil inside the first circumferential oil groove 41a flows to the second circumferential oil groove 41b through the inlet 6b (the internal space of the first lubricating oil passage 6a near the inlet 6b) of the first lubricating oil passage 6a of the journal part 6 of the crankshaft when the inlet 6b of the first lubricating oil passage 6a of the journal part 6 is in communication with the first circumferential oil groove 41a and the second circumferential oil groove 41b.

The lubricating oil is fed only to the first circumferential oil groove 41a. Thus, since the amount of the discharge oil of the oil pump can be set on the basis of the internal volume of one circumferential oil groove 41a, a sufficient amount of lubricating oil can be supplied even by a small oil pump. In addition, since the lubricating oil is supplied to the first lubricating oil passage 6a of the journal part 6 through both the circumferential oil grooves 41a and 41b, the lubricating oil can be continuously supplied to the crankpin part 5.

(2) The length L1 in the circumferential direction of the separation part 41c and the length L2 in the circumferential direction of the inlet 6b of the journal part 6 satisfy the following relational expression: $L1 \geq L2 \times 0.5$. Thus, the amount of lubricating oil flowing from the first circumferential oil groove 41a into the second circumferential oil groove 41b can be prevented from becoming too large by limiting the area of the clearance between the separation part 41c and the inlet 6b. Thus, the required amount of lubricating oil can be supplied to the crankpin part 5. That is, if the length L1 in the circumferential direction of the separation part 41c is too short, the time during which the first circumferential oil groove 41a and the second circumferential oil groove 41b communicate with each other through the inlet 6b of the journal part 6 becomes longer, and the amount (leak amount) of the lubricating oil flowing from the first circumferential oil groove 41a to the second circumferential oil groove 41b increases, resulting in that the discharge flow rate of the oil pump have to be made somewhat larger.

(3) It is possible to prevent leakage of the lubricating oil from the first circumferential oil groove 41a to the second circumferential oil groove 41b over the separation part 41c by making the length L1 in the circumferential direction of the separation part 41c at a position in the inner circumferential surface of the half bearing 41 to be 1 mm or longer. That is, when the length L1 in the circumferential direction of the separation part 41c is shorter than 1 mm, the lubricating oil inside the first circumferential oil groove 41a flows easily into the second circumferential oil groove 41b over the separation part 41c by being entrained on the surface of the rotating journal part 6.

(4) When the length in the circumferential direction of the separation part 41c at a position in the inner circumferential surface of the upper half bearing 41 is L1, and the length in the circumferential direction of the inlet 6b of the journal part 6 is L2, the following expression $L2-L1 > 0.5$ (mm) is satisfied. Thus, the clearance having a predetermined area provided between the separation part 41c and the inlet 6b allows the lubricating oil inside the first lubricating oil passage 6a and the lubricating oil inside the first circumferential oil groove 41a to flow more easily to the second circumferential oil groove 41b.

(5) The total internal volume obtained by adding up the internal volume of the first circumferential oil groove 41a and the internal volume of the second circumferential oil groove 41b is smaller than the internal volume of the oil supplementing passage 81b. Thus, in a state where the first circumferential oil groove 41a and the second circumferential oil groove 41b communicate with each other through the inlet 6b, the amount of lubricating oil which is instantaneously required can be secured inside the oil supplementing passage 81b, so that the amount of lubricating oil supplied to the circumferential oil grooves 41a and 41b can be prevented from becoming instantaneously insufficient.

(6) The first circumferential oil groove 41a where the oil hole 41d is provided is positioned on the rear side in the rotational direction of the journal part 6 with respect to the second circumferential oil groove 41b. According to this configuration, the flow of the lubricating oil entrained on the surface of the journal part 6 enhances the flow F3 from the first circumferential oil groove 41a to the first lubricating oil passage 6a, and the flow F2 from the first lubricating oil passage 6a to the second circumferential oil groove 41b, so that the amount of oil supplied to the second circumferential oil groove 41b is increased.

EMBODIMENT 2

Figure 7:
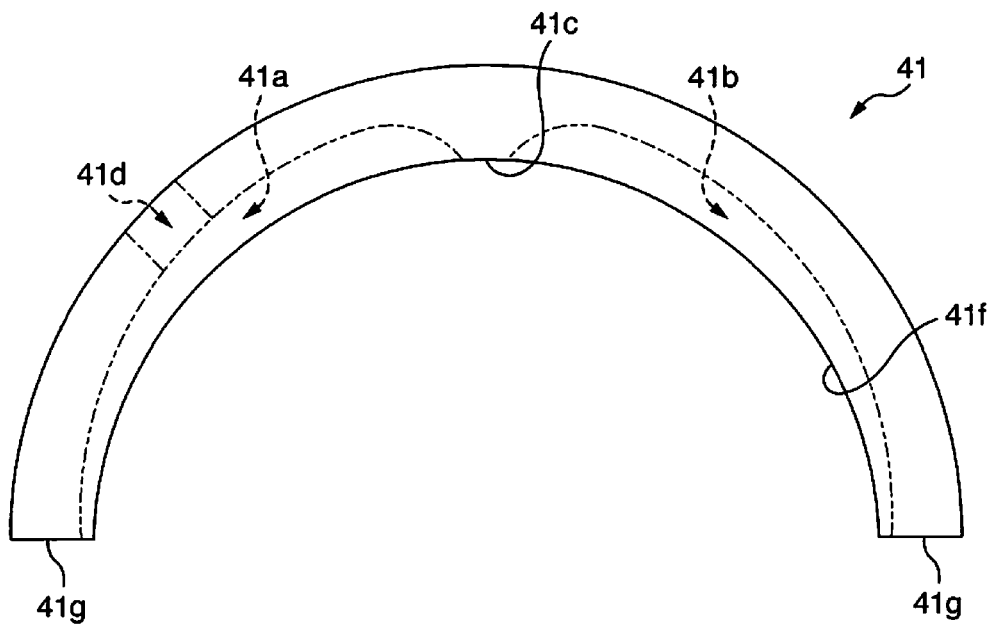
FIG. 7 is a side view illustrating a configuration of a half bearing of Embodiment 2.

In the following, the bearing device 1 having the half bearing 41 of a different form from that of Embodiment 1 will be described with reference to FIG. 7. The parts that are the same as or equivalent to those described in Embodiment 1 will be denoted by the same reference signs.

(Configuration)

Similarly to Embodiment 1, the bearing device 1 of this embodiment includes the journal part 6, the main bearing 4, the cylinder block 81, and the bearing cap 82. Among these parts, the half bearing 41 of this embodiment has the first circumferential oil groove 41*a* and the second circumferential oil groove 41*b* each of which is deepest at a position near the center in the circumferential direction of the half bearing 41 and gradually decreases in depth toward the end part. The first circumferential oil groove 41*a* and the second circumferential oil groove 41*b* are open on the circumferential end surfaces 41*g*, 41*g* of the half bearing 41.

(Operational Advantages)

Thus, since the first circumferential oil groove 41*a* and the second circumferential oil groove 41*b* are deepest at a position near the center in the circumferential direction of the half bearing 41 and gradually decrease in depth toward the end parts, it is possible to introduce the lubricating oil into the first circumferential oil groove 41*a* and the second circumferential oil groove 41*b* without disturbing the flow of the lubricating oil. In addition, it becomes easier to achieve the reduction in size of the oil pump by reducing the internal volumes of the first circumferential oil groove 41*a* and the second circumferential oil groove 41*b*.

Description of other configurations and operational advantages, which are almost the same as those of Embodiment 1, will be omitted here.

EMBODIMENT 3

Figure 8:
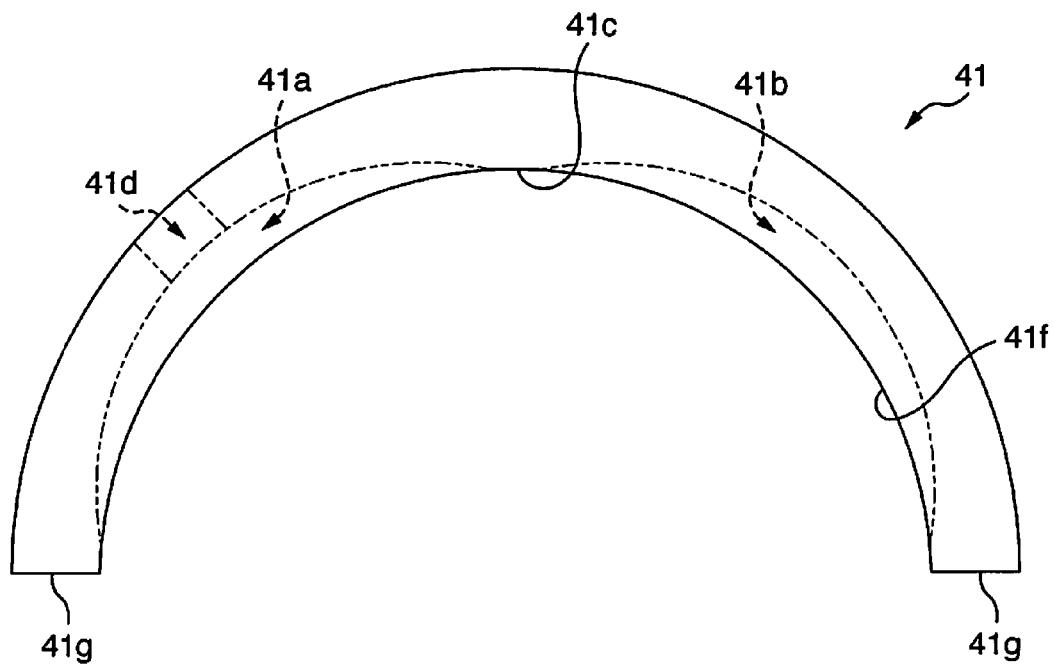
FIG. 8 is a side view illustrating a configuration of a half bearing of Embodiment 3.

In the following, the bearing device 1 having the half bearing 41 of a different form from that of Embodiments 1 and 2 will be described with reference to FIG. 8. The parts that are the same as or equivalent to those described in Embodiments 1 and 2 will be denoted by the same reference signs.

(Configuration)

Similarly to Embodiments 1 and 2, the bearing device 1 of this embodiment includes the journal part 6, the main bearing 4, the cylinder block 81, and the bearing cap 82. Among these parts, the half bearing 41 of this embodiment has the first circumferential oil groove 41*a* and the second circumferential oil groove 41*b* which are respectively deepest at a position near the center in the circumferential direction of the first circumferential oil groove 41*a* and the second circumferential oil groove 41*b* and gradually decrease in depth toward the end parts.

Unlike Embodiment 1, the first circumferential oil groove 41*a* and the second circumferential oil groove 41*b* are not open on the circumferential end surfaces 41*g*, 41*g* of the half bearing 41. In other words, the first circumferential oil groove 41*a* and the second circumferential oil groove 41*b* communicate with the inlet 6*b* of the oil passage of the journal part 6 in most of the region in the circumferential direction, but do not communicate with the inlet 6*b* of the oil passage of the journal part 6 near the end parts.

(Operational Advantages)

Thus, since the first circumferential oil groove 41*a* and the second circumferential oil groove 41*b* are respectively deepest at a position near the center in the circumferential direction of the first circumferential oil groove 41*a* and the second circumferential oil groove 41*b* and gradually decrease in depth toward the end parts, it is possible to introduce the lubricating oil into the first circumferential oil groove 41*a* and the second circumferential oil groove 41*b* without disturbing the flow of the lubricating oil. Moreover, as the first circumferential oil groove 41*a* and the second circumferential oil groove 41*b* are not open on the circumferential end surfaces 41*g*, 41*g*, no discontinuous connection portion is formed, so that the lubricating oil can flow more smoothly. In addition, it becomes easier to achieve the reduction in size of the oil pump by reducing the internal volume of the first circumferential oil groove 41*a* and the second circumferential oil groove 41*b*.

Description of other configurations and operational advantages, which are almost the same as those of Embodiments 1 and 2, will be omitted here.

EMBODIMENT 4

In the following, the bearing device 1 having the half bearing 41 of a different form from that of Embodiments 1 to 3 will be described with reference to FIGS. 9 and 10. The parts that are the same as or equivalent to those described in Embodiments 1 to 3 will be denoted by the same reference signs.

Similarly to Embodiments 1 and 2, the bearing device 1 of this embodiment includes the journal part 6, the main bearing 4, the cylinder block 81, and the bearing cap 82. Among these parts, the half bearing 41 of this embodiment includes crash reliefs 41*h*, 41*h* at the circumferential end parts on the inner circumferential surface side.

Figure 9:
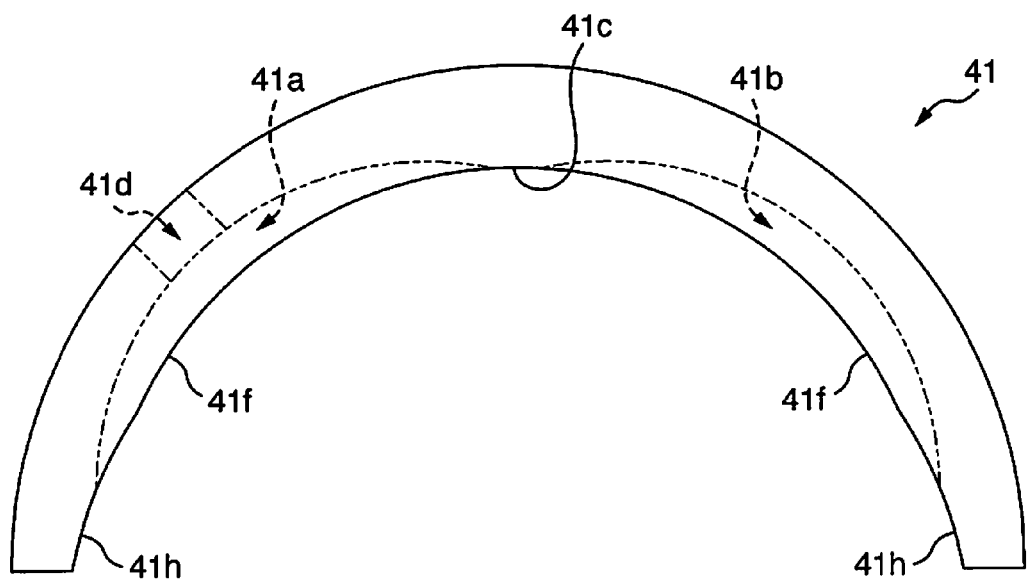
FIG. 9 is a side view illustrating a configuration of a half bearing of Embodiment 4.
Figure 10:
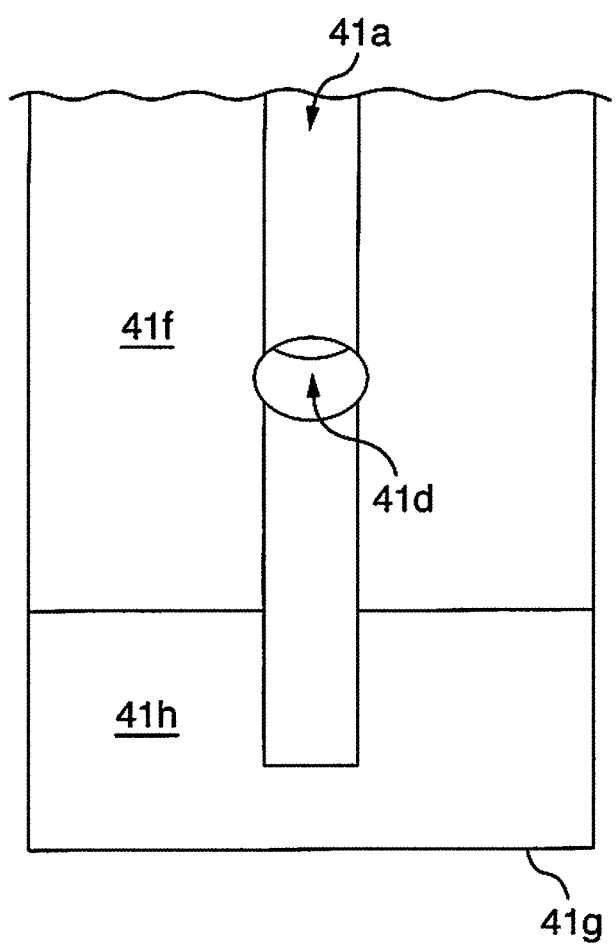
FIG. 10 is an internal view illustrating the configuration of the half bearing of Embodiment 4.

As shown in FIGS. 9 and 10, the crash relief 41*h* is formed by thinning the wall of the half bearing 41 in the radial direction, in the region of the circumferential end part, from the original inner circumferential surface 41*f* (sliding surface, major arc) which is concentric with the rotational center.

The crash relief 41*h* is formed for absorbing a positional shift or deformation of the circumferential end surfaces 41*g*, 41*g* of the half bearings 41 and 42, the positional shift or deformation being caused when the pair of half bearings 41 and 42 is mounted to the journal part 6 of the crankshaft.

Thus, the position of center of curvature of the inner circumferential surface in the region where the crash relief 41*h* is formed is different from the position of center of curvature of the inner circumferential surface (sliding surface, major arc) in other regions (see SAE J506 (item 3.26 and item 6.4), DIN 1497, section 3.2, and JIS D3102). Generally, in the case of the bearing for small internal combustion engines of passenger cars, the depth of the crash relief at the circumferential end surface of the half bearing (distance from the original inner circumferential surface to the actual inner circumferential surface) is approximately 0.01 to 0.05 mm.

The crash relief 41*h* gradually decreases in depth toward the center in the circumferential direction of the half bearing 41, and connects with the inner circumferential surface 41*f* at a predetermined connection position. As shown in FIGS. 9 and 10, the position at which the crash relief 41*h* connects with the inner circumferential surface 41*f* may be closer to the center in the circumferential direction of the first and second circumferential oil grooves 41*a* and 41*b* than to the circumferential end part. That is, the first and second circumferential oil grooves 41*a* and 41*b* may be open on the crash reliefs 41*h*, 41*h*. Alternatively, the position at which the crash relief 41*h* connects with the inner circumferential surface 41*f* may be closer to the circumferential end part of the first and second circumferential oil grooves 41*a* and 41*b* than to the center in the circumferential direction.

Description of other configurations and operational advantages, which are almost the same as those of Embodiments 1 to 3, will be omitted here.

While the embodiments of the present invention have been described above in detail with reference to the drawings, the specific configurations are not limited to these embodiments, and design changes to such a degree that does not depart from the scope of the present invention are included in the present invention.

For example, in the above embodiments, the first circumferential oil groove 41*a* and the second circumferential oil groove 41b are equal in groove width, groove depth, extent of formation, etc. However, the present invention is not limited to this example, and the first circumferential oil groove 41a and the second circumferential oil groove 41b may be different in groove width, groove depth, extent of formation, etc.

Although it is not limited in the above embodiments, the separation part 41c is preferably formed so as to include the center position in the circumferential direction of the half bearing 41. However, the center position of the length L1 in the circumferential direction of the separation part 41c may also be shifted toward the circumferential end part with respect to the center position in the circumferential direction of the half bearing 41.

Figure 15:
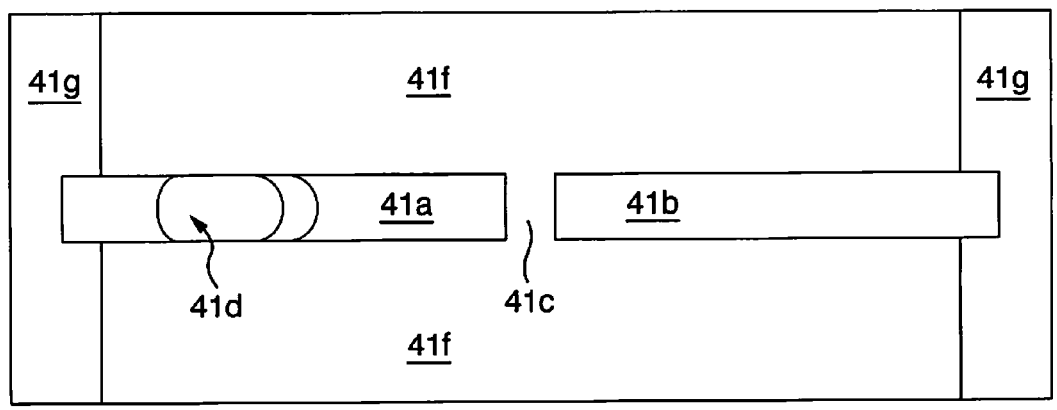
FIG. 15 is a bottom view illustrating an arrangement of a first oil hole and a second oil hole of another form.

Although the first oil hole 41d has a circular shape in the above embodiments, the present invention is not limited to this example. For example, the first oil hole 41d may have an oval shape, an elongated hole shape (FIG. 15), or the like.

As have been described in Embodiments 2 and 3, the first circumferential oil groove 41a and the second circumferential oil groove 41b may have a configuration where their circumferential end parts are open on the circumferential end surfaces 41g, 41g of the half bearing 41, or a configuration where they are not open on the circumferential end surfaces 41g, 41g. Another possible configuration is that only one of the first circumferential oil groove 41a and the second circumferential oil groove 41b is open on the circumferential end surface 41g while the other is not open on the circumferential end surface 41g.

Although it is not limited in the above embodiments, the width dimension of the first circumferential oil groove 41a and the second circumferential oil groove 41b is preferably smaller than the diameter of the inlet 6b of the first lubricating oil passage 6a of the journal part 6.

Although in the above embodiments, the wall thickness of the half bearings 41 and 42 in the region of the inner circumferential surface (sliding surface, major arc) is constant over the entire length in the circumferential direction, the present invention is not limited to this example. For example, the wall thickness of the half bearings 41 and 42 in the region of the inner circumferential surface (sliding surface, major arc) may gradually decrease or gradually increase from the center in the circumferential direction of the half bearings 41 and 42 toward the circumferential end parts.

The invention claimed is:

1. A bearing device for rotatably supporting a journal part of a crankshaft, comprising:
a journal part having an oil passage extending inside thereof and an inlet of the oil passage being open on an outer circumferential surface of the journal part;
a main bearing being constituted of a pair of half bearings and rotatably supporting the journal part; and
a cylinder block and a bearing cap being each formed with a holding bore for holding the main bearing, wherein
one half bearing being held in the holding bore of the cylinder block includes: a first circumferential oil groove and a second circumferential oil groove being formed at positions opposite to the inlet of the oil passage of the journal part in an inner circumferential surface of the one half bearing; a separation part separating the first circumferential oil groove and the second circumferential oil groove; and an oil hole penetrating from the first circumferential oil groove to an outer circumferential surface of the one half bearing, and
a length L1 in a circumferential direction of the separation part at a position in the inner circumferential surface of the one half bearing is smaller than a length L2 in the circumferential direction of the inlet of the journal part.

2. The bearing device according to claim 1, wherein a following expression is satisfied:

$$L1 \geq L2 \times 0.5$$

where L1 is the length in the circumferential direction of the separation part at a position in the inner circumferential surface of the one half bearing, and L2 is the length in the circumferential direction of the inlet of the journal part.

3. The bearing device according to claim 1, wherein the length L1 in the circumferential direction of the separation part at a position in the inner circumferential surface of the one half bearing is 1 mm or longer.

4. The bearing device according to claim 1, wherein a following expression is satisfied:

$$L2 - L1 > 0.5 \text{ (mm)}$$

where L1 is the length in the circumferential direction of the separation part at a position in the inner circumferential surface of the one half bearing, and L2 is the length in the circumferential direction of the inlet of the journal part.

5. The bearing device according to claim 1, wherein the cylinder block includes an oil supplementing passage communicating with the oil hole of the one half bearing, in a holding surface constituting the holding bore, and wherein a total internal volume obtained by adding up an internal volume of the first circumferential oil groove and an internal volume of the second circumferential oil groove is smaller than an internal volume of the oil supplementing passage.

6. The bearing device according to claim 1, wherein the first circumferential oil groove where the oil hole is provided is positioned on the rear side in the rotational direction of the journal part with respect to the second circumferential oil groove.

* * * * *